United States Patent
Shi et al.

(10) Patent No.: US 11,651,037 B2
(45) Date of Patent: May 16, 2023

(54) EFFICIENT CROSS-MODAL RETRIEVAL VIA DEEP BINARY HASHING AND QUANTIZATION

(71) Applicant: Rakuten Group, Inc., Tokyo (JP)

(72) Inventors: Yang Shi, Redwood City, CA (US); Young Joo Chung, Foster City, CA (US)

(73) Assignee: Rakuten Group, Inc., Tokyo (JP)

(*) Notice: Subject to any disclaimer, the term of this patent is extended or adjusted under 35 U.S.C. 154(b) by 391 days.

(21) Appl. No.: 16/869,408

(22) Filed: May 7, 2020

(65) Prior Publication Data

US 2021/0191990 A1 Jun. 24, 2021

Related U.S. Application Data

(60) Provisional application No. 62/952,090, filed on Dec. 20, 2019.

(51) Int. Cl.
*G06F 16/903* (2019.01)
*G06F 40/30* (2020.01)
(Continued)

(52) U.S. Cl.
CPC ........ *G06F 16/90348* (2019.01); *G06F 17/16* (2013.01); *G06F 18/22* (2023.01);
(Continued)

(58) Field of Classification Search
CPC .... G06F 16/90348; G06F 40/30; G06F 17/16; G06K 9/6215; G06N 3/0454; G06V 10/761; G06V 30/19093
See application file for complete search history.

(56) References Cited

U.S. PATENT DOCUMENTS

| 2015/0154229 A1* | 6/2015 | An ..................... G06V 10/7784 707/756 |
| 2020/0380027 A1* | 12/2020 | Aggarwal ........... G06F 16/3334 |
| 2021/0012150 A1* | 1/2021 | Liu .................. G06V 30/19173 |

FOREIGN PATENT DOCUMENTS

| CN | 110019652 A | * 7/2019 | ........... G06F 16/325 |
| CN | 110309331 A | * 10/2019 | ........... G06F 16/325 |

OTHER PUBLICATIONS

Cao et al., "Deep Visual-Semantic Hashing for Cross-Modal Retrieval", KDD '16: Proceedings of the 22nd ACM SIGKDD International Conference on Knowledge Discovery and Data Mining, Aug. 2016, pp. 1445-1454 (Year: 2016).*

(Continued)

*Primary Examiner* — Hosain T Alam
*Assistant Examiner* — Robert F May
(74) *Attorney, Agent, or Firm* — Lessani Law Group, PC

(57) ABSTRACT

The present disclosure relates to a new method for cross-modal retrieval via deep binary hashing and quantization. In a training phase, the system simultaneously learns to generate feature vectors, binary codes, and quantization codes for data across two or more modalities that preserves the semantic similarity correlations in the original data. In a prediction phase, the system retrieve a data item in a database that is semantically similar to a query item of a different modality. To identify the database item closest in semantic meaning to the query item, the system first narrows the database search space based on binary hash code distances between each of the database items and the query item. The system then measures the quantization distances between the query items and the database items in the smaller search space. The system identifies database item have the closest quantization distance to the query item as the closest semantic match to the query item.

14 Claims, 6 Drawing Sheets

(51) Int. Cl.

| | | |
|---|---|---|
| *G06F 17/16* | (2006.01) | |
| *G06F 18/22* | (2023.01) | |
| *G06N 3/045* | (2023.01) | |
| *G06V 10/764* | (2022.01) | |
| *G06V 10/774* | (2022.01) | |

(52) U.S. Cl.
CPC ............. *G06F 40/30* (2020.01); *G06N 3/045* (2023.01); *G06V 10/764* (2022.01); *G06V 10/774* (2022.01)

(56) References Cited

OTHER PUBLICATIONS

Yang et al., "Shared Predictive Cross-Modal Deep Quantization", Feb. 14, 2018, IEEE Transactions on Neural Networks and Learning Systems (vol. 29, Issue: 11, Nov. 2018) (Year: 2018).*
Wan et al., "Discriminative Latent Semantic Regression for Cross-Modal Hashing of Multimedia Retrieval", Oct. 21, 2018, 2018 IEEE Fourth International Conference on Multimedia Big Data (BigMM) (Year: 2018).*
Bronstein et al., "Data Fusion through Cross-modality Metric Learning using Similarity-Sensitive Hashing", 2010, pp. 1-8.
Cao et al., "Collective Deep Quantization for Efficient Cross-Modal Retrieval", Proceedings of the Thirty-First AAAI Conference on Artificial Intelligence, 2017, pp. 3974-3980.
Cao et al., "Correlation Hashing Network for Efficient Cross-Modal Retrieval", 2016, pp. 1-12.
Cheng et al., "Wide & Deep Learning for Recommender Systems", DLRS '16, Sep. 15, 2016, pp. 1-4.
Deng et al., "DeepCF: A Unified Framework of Representation Learning and Matching Function Learning in Recommender System", 2019, pp. 1-9.
Ding et al., "Collective Matrix Factorization Hashing for Multimodal Data", 2014, pp. 4321-4328.
Dong et al., "A Hybrid Collaborative Filtering Model with Deep Structure for Recommender Systems", Proceedings of the Thirty-First AAAI Conference on Artificial Intelligence, 2017, pp. 1309-1315.
Gong et al., "Learning Binary Codes for High-Dimensional Data Using Bilinear Projections", 2013, pp. 484-491.
Guo et al., "DeepFM: A Factorization-Machine based Neural Network for CTR Prediction", Proceedings of the Twenty-Sixth International Joint Conference on Artificial Intelligence, 2017, pp. 1725-1731.
He et al., "Neural Collaborative Filtering", WWW 2017, Apr. 3-7, 2017, pp. 1-10.
He et al., "Neural Factorization Machines for Sparse Predictive Analytics", SIGIR '17, Aug. 7-11, 2017, pp. 355-364.
He et al., "Outer Product-based Neural Collaborative Filtering", Proceedings of the Twenty-Seventh International Joint Conference on Artificial Intelligence 2018, pp. 2227-2233.
Jiang et al., "Deep Cross-Modal Hashing", 2017, pp. 3232-3240.
Koren, "Factorization Meets the Neighborhood: a Multifaceted Collaborative Filtering Model", KDD 2008, Aug. 24-27, 2008, pp. 426-434.
Kumar et al., "Learning Hash Functions for Cross-View Similarity Search", 2011, pp. 1-6.
Li et al., "Deep Binary Reconstruction for Cross-modal Hashing", MM '17, Oct. 23-27, 2017, pp. 1-8.
Li et al., "Deep Collaborative Filtering via Marginalized Denoising Auto-encoder", CIKM '15, Oct. 19-23, 2015, pp. 811-820.
Li et al., "Coupled Cycle-GAN: Unsupervised Hashing Network for Cross-Modal Retrieval", Thirty-Third AAAI Conference on Artificial Intelligence, 2019, pp. 176-183.
Li et al., "Deep Heterogeneous Autoencoders for Collaborative Filtering", 2018, pp. 1-6.
Li et al., "Self-Supervised Adversarial Hashing Networks for Cross-Modal Retrieval", 2018, pp. 4242-4251.
Lian et al., "xDeepFM: Combining Explicit and Implicit Feature Interactions for Recommender Systems", KDD 2018, Aug. 19-23, 2018, pp. 1-10.
Liu et al., "Recommender Systems with Heterogeneous Side Information", WWW '19, May 13-17, 2019, pp. 1-7.
Long et al., "Composite Correlation Quantization for Efficient Multimodal Retrieval", SIGIR '16, Jul. 17-21, 2016, pp. 1-11.
Ricci et al., "Recommender Systems Handbook", 2011.
Sedhain et al., "AutoRec: Autoencoders Meet Collaborative Filtering", WWW 2015 Companion, May 18-22, 2015, pp. 1-2.
Strub et al., "Hybrid Recommender System based on Autoencoders", Workshop on Deep Learning for Recommender Systems, Sep. 2016, pp. 1-7.
Su et al., "Deep Joint-Semantics Reconstructing Hashing for Large-Scale Unsupervised Cross-Modal Retrieval", 2019, pp. 3027-3035.
Takacs et al., "Matrix Factorization and Neighbor Based Algorithms for the Netflix Prize Problem", ReeSys 2008, Oct. 23-25, 2008, pp. 267-274.
Wang et al., "Collaborative Deep Learning for Recommender Systems", KDD '15, Aug. 10-13, 2015, pp. 1235-1244.
Wang et al., "Effective Multi-Modal Retrieval based on Stacked Auto-Encoders", Proceedings of the VLDB Endowment, Sep. 1-5, 2014, pp. 649-660.
Wu et al., "Quantized Correlation Hashing for Fast Cross-Modal Search", Proceedings of the Twenty-Fourth International Joint Conference on Artificial Intelligence, 2015, pp. 3946-3952.
Wu et al., "Unsupervised Deep Hashing via Binary Latent Factor Models for Large-scale Cross-modal Retrieval", Proceedings of the Twenty-Seventh International Joint Conference on Artificial Intelligence, 2018, p. 2854-2860.
Xue et al., "Deep Matrix Factorization Models for Recommender Systems", Proceedings of the Twenty-Sixth International Joint Conference on Artificial Intelligence, 2017, pp. 3203-3209.
Yang et al., "Shared Predictive Cross-Modal Deep Quantization", IEEE Transaction on Neural Networks and Learning Systems, 2019, pp. 1-12.
Zhang et al., "AutoSVD++: An Efficient Hybrid Collaborative Filtering Model via Contractive Auto-encoders", SIGIR '17, Aug. 7-11, 2017, pp. 957-960.
Zhang et al., "Collaborative Quantization for Cross-Modal Similarity Search", 2019, pp. 1-10.
Zhang et al., "Large-Scale Multimodal Hashing with Semantic Correlation Maximization", Association for the Advancement of Artificial Intelligence, 2014, pp. 1-7.

\* cited by examiner

EFFICIENT CROSS-MODAL RETRIEVAL VIA DEEP BINARY HASHING AND QUANTIZATION

RELATED APPLICATIONS

This application claims the benefit of U.S. Provisional Application No. 62/952,090 filed on Dec. 20, 2019, and titled "Efficient Cross-Modal Retrieval via Deep Binary Hashing and Quantization," the contents of which are incorporated by reference herein as if fully disclosed herein.

BACKGROUND OF THE INVENTION

1. Field of the Invention

This invention relates generally to using neural networks for cross-modal data retrieval and, more specifically, to a more efficient cross-modal retrieval system that uses both deep binary hashing and quantization.

2. Description of the Background Art

With the expansion of multimedia data, approximate nearest neighbor search across different content modalities has gained huge attention. Cross-modal retrieval aims to search for data with similar semantic meaning across different content modalities. An example of cross-modal data retrieval is to match a photo to a text that correctly describes the photo.

There are various known methods for cross-modal retrieval. In some methods, dense feature vectors are generated for data items of different modalities, and various search and ranking algorithms, such as cosine similarity search, are then applied to the dense feature vectors to identify semantically similar items across modalities. (See Amit Singhal, Modern information retrieval: A brief overview, *Bulletin of the IEEE Computer Society Technical Committee on Data Engineering*, pages 34-43, 2001). Handcrafted statistics and various deep neural networks are used extract dense features. However, searching and ranking based on dense feature representations suffers from limitations in memory and computational efficiency.

To solve the efficiency issue, various coding methods have been proposed for cross-modal retrieval. In these methods, a coded representation of each data item is created from extracted features of the item. Some methods involve generating binary codes for data items given hand-crafted features and calculating the distances between items based on the binary codes. (See Shaishav Kumar and Raghavendra Udupa, Learning hash functions for cross-view similarity search, *IJCAI* pages 1360-1365, 2001. See also Yi Shen and Dit-Yan Yeung, A probabilistic model for multi-modal hash function learning, KDD, pages 940-948, 2012). While these methods are more computationally efficient than searching based on dense feature vectors, they are less accurate due to the limited ability of binary codes to express data. To overcome this limitation, some methods use quantization codes instead of binary codes. (See Yue Cao, Mingsheng Long, Jianmin Wang, and Shichen Liu, Collective deep quantization for efficient cross-modal retrieval, *AAAI*, pages 3974-3980, 2017. See also Erkun Yang, Cheng Deng, Chao Li, Wei Liu, Jie Li, and Dacheng Tao, Shared predictive cross-modal deep quantization, *IEEE Transaction on Neural Networks and Learning Systems*, 2019). Since quantization codes are continuous values, they are able to better express the underlying data, resulting in more accurate retrieval. However, quantization-based methods suffer with respect to computational efficiency as compared to binary hashing. Therefore, there is demand for a cross-modal retrieval system that is more accurate than known binary-code-based methods and more computationally efficient than known quantization-code-based methods.

SUMMARY OF THE DISCLOSURE

The present disclosure relates to a new method for cross-modal retrieval via deep binary hashing and quantization. The method is performed by a computer system. In a training phase, the system simultaneously learns neural network models, a binary hash algorithm, and a quantization algorithm that collectively enable the system to generate feature vectors, binary hash codes, and quantization codes across two or more data modalities, where semantic similarity correlations in the underlying data are preserved in these data representations. Specifically, the system applies neural networks to labeled training data of different modalities to generate feature vectors for the training data, and uses a binary hash algorithm and a quantization algorithm to generate the binary hash codes and quantization codes, respectively, for the training data from the feature vectors. The training data comprises pairs of data items labeled as similar or dissimilar, where each pair includes at least two data items of different modalities. A well-defined loss function is used to ensure that the learned features and codes preserve the similarity or dissimilarity correlations between training data items across the modalities. In one embodiment, the loss function comprises four parts: (1) a cross-entropy loss that measures similarities between different modalities based on dense feature vectors; (2) a quantization loss that measures differences between dense feature vectors and quantized features; (3) a binary hashing loss that measures differences between dense features vectors and binarized features; and (4) a balance loss to optimize bit information in binary code. For a number of iterations, the system generates feature vectors, binary hash codes, and quantization codes for the training data, calculates a loss value based on these representations, and then updates the parameters of the neural networks, binary hash algorithm, and quantization algorithm to minimizing the loss value. In this way, the system simultaneously learns the neural network models, binary hash algorithm, and quantization algorithm that will preserve sematic similarity correlations across the data modalities.

In a prediction phase, the system retrieves a data item in a database that is semantically similar to a query item of a different modality. The data modalities at issue in the prediction phase are the same as those in the training phase. To identify the database item closest in semantic meaning to the query item, the system first narrows the database search space based on binary hash code distances between each of the database items and the query item. The binary hash codes for the query item and the database items are generated based on the neural networks and binary hash algorithm trained in the training phase. The system then measures the similarity between the query items and the data in the smaller search space using quantization codes generated for the database items in the smaller search space (based on the quantization algorithm trained in the training phase). The system retrieves the closest database item identified using the quantization codes as the closest semantic match to the query item.

The advantages of this method are at least twofold:
(1) Retrieval efficiency: By narrowing down the search space using simple binary codes, the retrieval process is significantly sped up as compared to methods that search based on only dense feature vectors or quantization codes; and
(2) Retrieval quality: The feature learning is constrained with hashing and quantization loss. While quantization learns a limited number of continuous feature representations, binary hashing discretizes the features. The combination of these two coding methods acts as a regularization in feature learning and enables the system to learn good data representations that preserve similarity or dissimilarity across data modalities.

DETAILED DESCRIPTION OF THE PREFERRED EMBODIMENTS

The present disclosure relates to a system, method, and computer program for cross-modal retrieval via deep binary hashing and quantization. The methods disclosed herein are performed by a computer system ("the system").

The method includes a training phase and a prediction phase. In the training phase, the system simultaneously learns to generate feature vectors, binary codes, and quantization codes for data across two or more modalities that preserves the semantic similarity correlations in the original data. Preserving semantic similarity correlations includes preserving both similarity and dissimilarity relationships (as applicable) between data items. In the prediction phase, the system retrieve a data item in a database that is semantically similar to a query item of a different modality using both binary hashing and quantization. The data modalities involved in the prediction phase are the same as in the training phase.

The training and prediction phases each may be performed by different entities (e.g., a computer system at one entity may train the models, and a computer system at another entity may use the trained models to perform cross-modal retrieval). Therefore, the term "system" herein may refer to a system that performs both phases, or, in the training phase description, it may refer to the system that performs only the training phase, and, in the prediction phase description, it may refer to the system that performs only the prediction phase. Regardless, each of these phases is performed by a computer system. Both the training phase and the prediction phase are described in more detail below.

Figure 1:
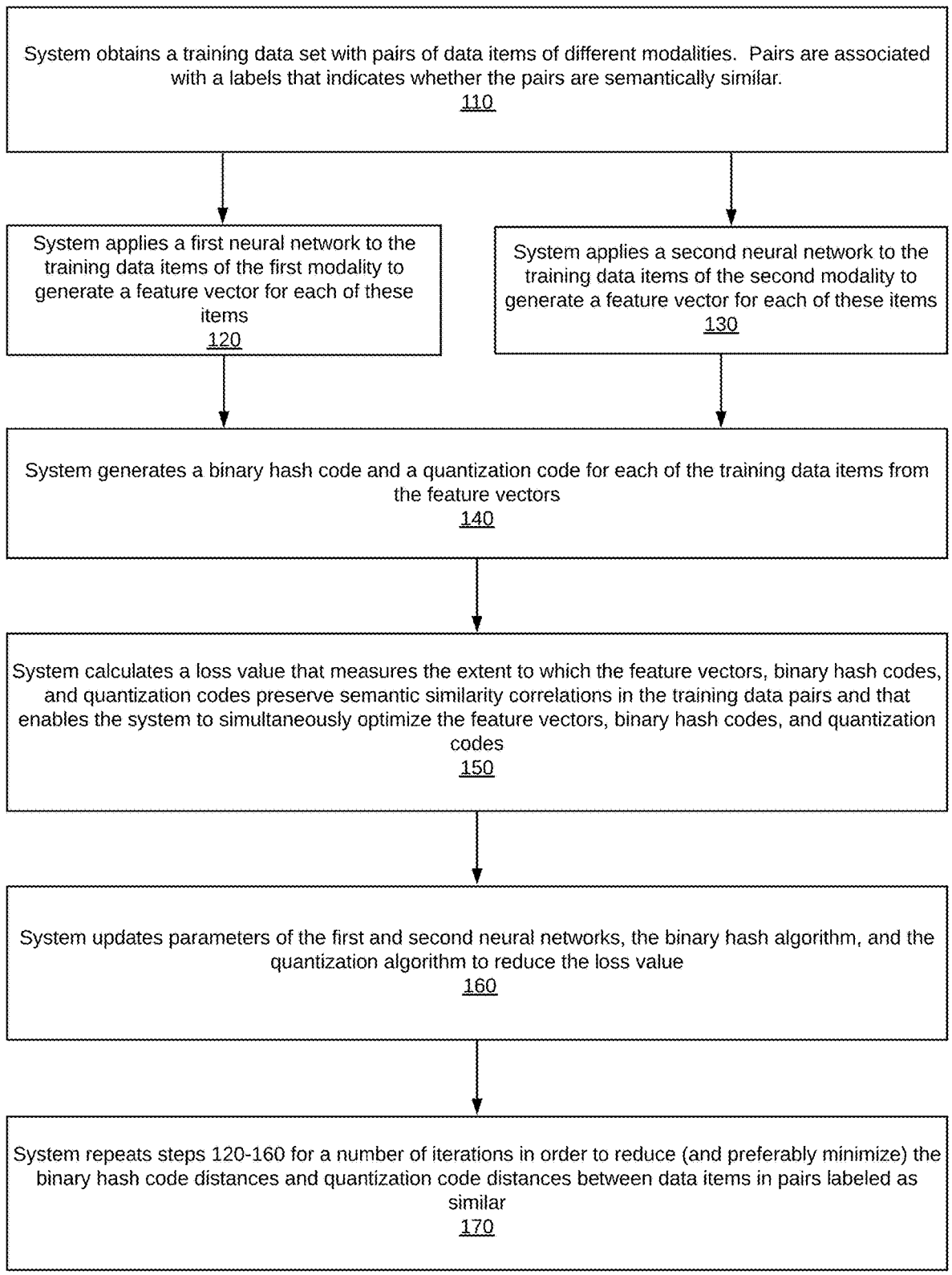
FIG. 1 is a flowchart that illustrates a method, according to one embodiment, for training a system to perform cross-modal data retrieval using binary hashing and quantization codes.
Figure 3A:
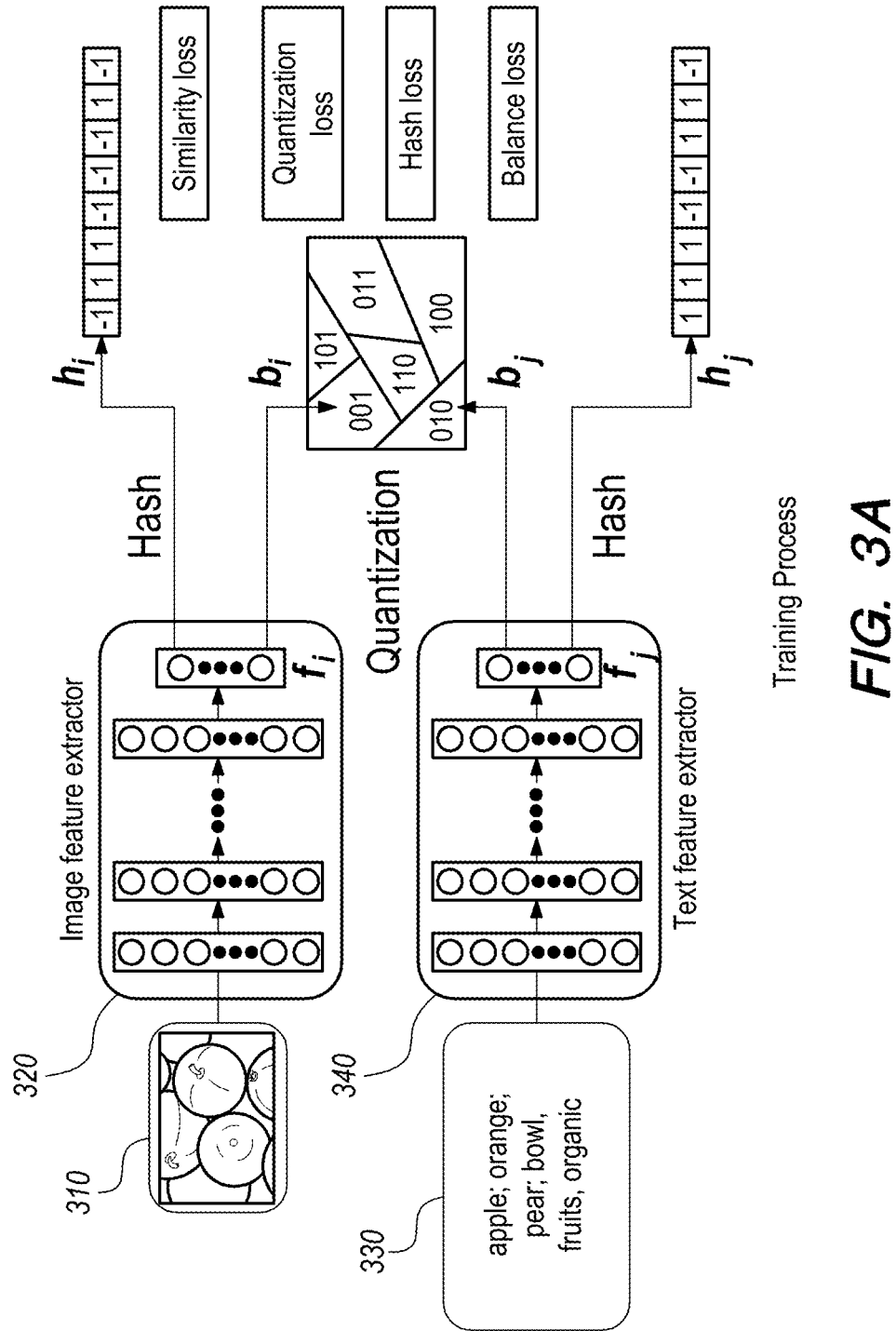
FIG. 3A is a diagram that illustrates a pictorial example of the training process.

1. Training Phase
The training method is described with respect to FIG. 1 and FIG. 3A. FIG. 1 illustrates a method for training a system to perform cross-modal data retrieval using binary hashing and quantization. FIG. 3A is a pictorial example of the training method according to one embodiment. In the depicted example, the two data modalities are images and text, but the method is not limited to these modalities.

1.1 Training Data
The system obtains a training data set with pairs of data items of different modalities (step 110). Specifically, each pair includes a data items of a first modality and a data item of a second modality, wherein the first and second data modalities are different. Examples of data modalities are text, images, video, etc. For example, one item in the pair may be a text item and the other item may be an image or a video.

The pairs are associated with a label that indicates whether the pairs are semantically similar. In one embodiment, the pairs are labeled in a binary fashion simply as similar or dissimilar. For example, a pair with the text "dog" and a photo of a dog would be labeled similar (or a numeric representation of similar, such as "1"), and a pair with the text "car" and a photo of the dog would be labeled as "dissimilar" (or a numeric representation of dissimilar, such as "0"). In other embodiments, a more gradual scale is used to indicate the degree of similarity. For example, there may a scale from 0-5, where 0 indicates most dissimilar and 5 indicates most similar. In such case, a pair with the text "donut" and a photo of a donut may be labeled with a "5", while a pair with the text "food" and a photo of donut may be labeled "3", and a pair with the text "cat" and a photo of a donut may be labeled as "0".

1.2 Generating Feature Vectors
Neural networks are used to generate feature vector representations of the training data items. Specifically, the system applies a first neural network to data items of the first modality in the training data set to generate a feature vector for each of these items (step 120). Likewise, the system applies a second neural network to data items of the second modality in the training data set to generate a feature vector for each of these items (step 130)). For example, in FIG. 3A, neural network 320 generates a feature vector $f_i$ for each input training image 310, and neural network 340 generates a feature vector $f_j$ for each input training text item 330. In certain embodiments, a convolutional neural network is applied to image or video data items, and a long short-term neural network (LSTM) or multilayer perceptron is applied to text data. In certain embodiments, the feature vectors are dense feature vectors.

1.3 Generating Binary Hash Codes and Quantization Codes
As described in more detail below, the system generates a binary hash code and a quantization code for each of the training data items from the feature vector for the item (step 140).

1.3.1 Binary Hashing Given feature vector $x \in R^n$ for a data item, the system computes a binary hashing code $h_x = H(x) \in R^n$, where H() is a function that maps continuous value to $\{+1,-1\}$. For example, in FIG. 3A, binary hash code $h_i$ is generated based on image feature vector $f_i$, and binary hash code $h_j$ is generated based on text feature vector $f_j$.

1.3.2 Quantization
Given feature vector $x \in R^n$ for a data item, the system computes a quantization code $Cb_x \approx x$, where $C \in R^{n \times k}$ is the dictionary book for quantization, and $b_x$ is the index indicator or quantization code that indicates a column in the dictionary book. In certain embodiments, the system assumes that the input can belong to only one of the dictionaries (i.e., $\|b_x\|_0 = 1$). In FIG. 3A, quantization code $b_i$ is generated based on image feature vector $f_i$, and quantization code $b_j$ is generated based on text feature vector $f_j$.

1.4 Simultaneously Optimizing Feature Vectors, Binary Hash Codes, and Quantization As described below, the system iteratively generates features vectors, binary hash codes, and quantization codes for the training data (step 120-140), calculates a loss value based on these representations (step 150), and adjusts the parameters of the neural networks, binary hash algorithm, and quantization algorithm to minimize the loss value (step 160). The system uses a loss function that measures the extent to which the learned features and the binary hash and quantization codes preserve the semantic similarity correlations between training data items across modalities (e.g., the hash codes and quantization codes for two semantically similar data items are trained to be similar).

In one embodiment, the loss function comprises four parts: (1) a cross-entropy loss that measures similarities between different modalities based on dense feature vectors; (2) a quantization loss that measures differences between dense feature vectors and quantized features; (3) a binary hashing loss that measures differences between dense features vectors and binarized features; and (4) a balance loss to optimize bit information in binary code. This type of loss function enables the system to simultaneously optimize the feature vectors, binary hash codes, and quantization codes.

The equations below provide an example of how a loss function with the four parts (i.e., four sub-functions) described above may be defined. For the equations below, we define a training pair as having data items i, j that come from different modalities. The data items have dense representations features $f_i$, $f_j$, and the pair has the similarity label $s_{ij}$, where $s_{ij}=1$ means items i, j are similar, and $s_{ij}=0$ means items i, j are dissimiliar. Examples of each of the four sub-functions are set forth below:

Similarity loss: To measure the similarity between different modalities, the Maximum a Posteriori (MAP) estimation may be used. The logarithm MAP is $$\log p(f_i, f_i | s_{ij}) \propto \log p(s_{ij} | f_i, f_j) p(f_j) p(f_i) \quad (1)$$

In equation 1, the conditional likelihood for similarity label $s_{ij}$ is:

$$p(s_{ij} | f_i, f_j) = \begin{cases} \sigma(\langle f_i, f_j \rangle) & s_{ij}=1 \\ 1-\sigma(\langle f_i, f_j \rangle) & s_{ij}=0 \end{cases} = \sigma(\langle f_i, f_j \rangle)^{s_{ij}} (1-\sigma(\langle f_i, f_j \rangle))^{1-s_{ij}} \quad (2)$$

Where $$\sigma(x) = 1/(1+e^{-x})$$

is the sigmoid function, and $\langle x,y \rangle$ is the inner product operation. Assuming the prior for $f_i$ and $f_j$ is known, the cross entropy loss term, denoted $L_{sim}$, may be expressed as:

$$L_{sim} = \sum_{ij} \left( \log\left(1+e^{\langle f_i, f_j \rangle}\right) - s_{i,j} \langle f_i, f_j \rangle \right) \quad (3)$$

Hash Loss: A hash loss function minimizes binary code error. Given the binary code $h \in \{+1,-1\}$, where n is the binary code length, the hash loss, denoted $L_h$, may be expressed as:

$$L_h = \Sigma_{ij}(\|f_i-h_i\|_F^2 + \|f_j-h_j\|_F^2) \quad (4)$$

Balance Loss: A balance loss function optimizes the bit information in binary code (so that bit information is used maximally). The balance loss, denoted $L_b$, may be expressed as follows:

$$L_b = \Sigma_{ij}(\|f_i 1\|_F^2 + \|f_j 1\|_F^2)$$

Where 1 is a vector of 1s. It balances the number of +1 and −1 in each training sample, Quantization Loss: To minimize quantization error, the system uses multiple dictionary books and sums over their results:

$$f \approx \sum_{l=1}^{m} C^l b^l,$$

where each dictionary book $C^l \in \mathbb{R}^{n \times k}$ binary indicator $b^l \in \{0,1\}^k$, and $\|b^l\|_0=1$. The quantization loss, denoted $L_q$, may be expressed as follows:

$$L_q = \sum_{i,j} \left( \left\| f_i - \sum_{l=1}^{m} C^l b_i^l \right\|_F^2 + \left\| f_j - \sum_{l=1}^{m} C^l b_j^l \right\|_F^2 \right)$$

Combining these four loss sub-functions, results in the following loss function L:

$$L = l_{sim} L_{sim} + l_h L_h + l_b L_b + l_q L_q$$

Where $l_{sim}$, $l_h$, $l_h$, $l_q$ are hyperparameters to balance between the different loss sub-functions.

After calculating a loss value, the system adjusts the parameters of the neural network, the binary hash algorithm, and the quantization algorithm to reduce the loss value. In other words, the system adjusts the parameters of the neural network, the binary hashing code h, the dictionary book C, and the quantization code b to reduce the loss value. Steps 120-160 are repeated for a number of iterations to reduce (and preferably minimize) the binary hash code distances and quantization code distances between data items in a pair labeled as similar (or most similar in a gradual scale) (step 170). In each successive iteration, new feature vectors, binary hash codes, and quantization codes are generated based on the adjustments made to the neural networks, binary hash algorithm, and quantization algorithm in the proceeding iteration. Steps 120-160 may be repeated for a fixed number of iterations or until convergence is achieved.

2. Prediction Phase

Figure 2A:
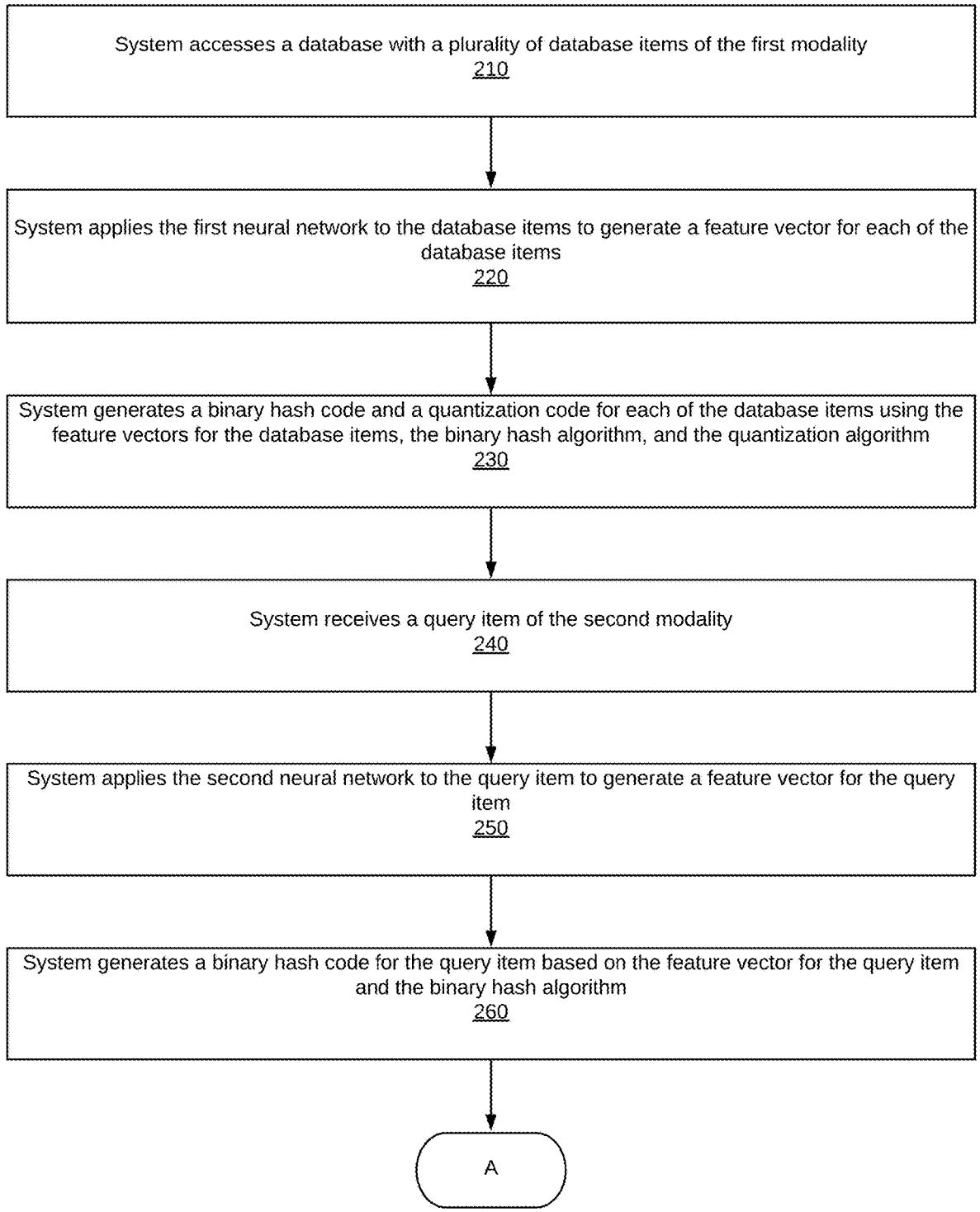
FIGS. 2A-B are flowcharts that illustrate a method, according to one embodiment, for cross-modal retrieval using binary hashing and quantization codes.
Figure 2B:
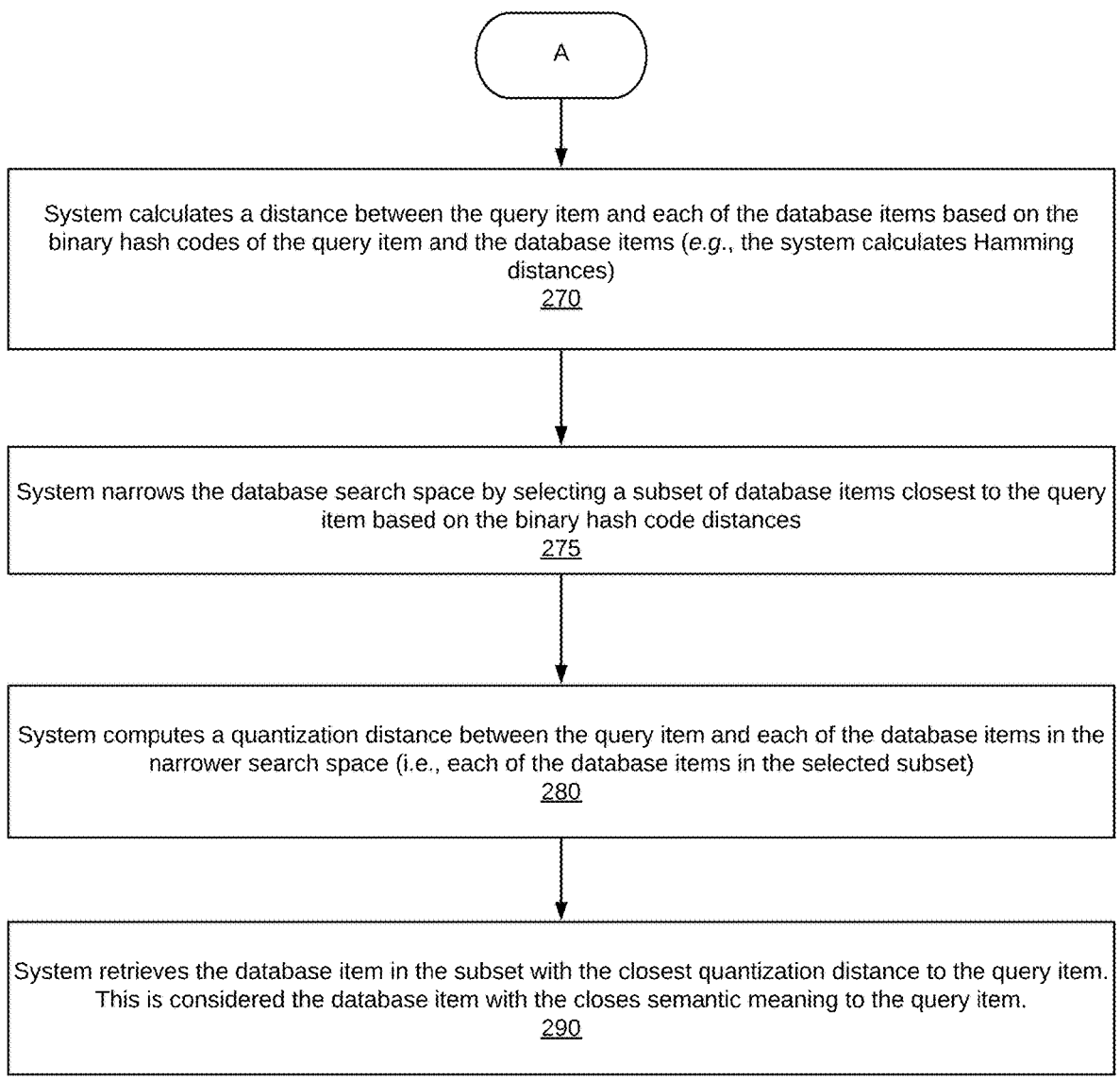

FIGS. 2A-2B illustrate a method for cross-modal retrieval of a database item having similar semantic meaning to a query item of a different modality using binary hashing and quantization. In the prediction phase, the system uses the neural networks, binary hash algorithm, and quantization algorithm trained in the training phase. The data modalities in the prediction phase are the same as the data modalities in the training phase. For purposes of this description, the database items are of the first modality (same as first modality in the training phase) and the query item is of the second modality (same as the second modality in the training phase).

2.1 Generating Binary Hash Codes and Quantization Codes for Database Items of a First Modality The system accesses a database with a plurality of database items of the first modality (step 210). The system applies the first neural network to the database items to generate a feature vector for each of the database items (step 220). The system generates a binary hash code and a quantization code for each of the database items using the feature vectors for the database items, the binary hash algorithm, and the quantization algorithm (step 230). The first neural network and the binary hash and quantization algorithms used in these steps were trained in the training phase.

As stated above, in certain embodiments, systems at different entities may perform the training and prediction phases. The steps of creating binary hash codes and quantization codes for the database item may be performed by the same system that performs the training, and the system that performs the prediction phase may simply access a database that already has binary hash codes and quantization codes associated with the database items.

2.2 Receiving a Query Item of a Second Modality

The system performing the prediction phase receives a query item of the second modality and applies the second neural network to the query item to generate a feature vector for the query item (steps 240, 250). The system then generates a binary hash code for the query item based on the feature vector and the binary hash algorithm (step 260). In certain embodiments, the system also will generate a quantization code for the query item, depending on whether quantization distance or asynchronous quantization distance (AQD) is used to measure similarities between items based on quantization codes (discussed below).

2.3 Narrowing the Search Field Using Binary Hash Codes

The system calculates a distance (i.e., a similarity measure) between the query item and each of the database items based on the binary hash codes of the query item and the database items (step 260). In one embodiment, the similarity measure is a Hamming distance: $\text{dist}(h_x, h_y) = \text{sum}(h_x \text{XOR} h_y)$, where $h_x$ and $h_y$ are the binary hash codes for query item x and database item y. The larger the value of the Hamming distance, the more semantically dissimilar items x and y are. The system then narrows the database search space by selecting a subset of database items for further processing. Specifically, the system selects a number of semantically closest database items to the query item based on the distances calculated in step 270 (step 275).

2.4 Identifying the Database Item with the Closest Semantic Similarity Based on Quantization Codes The system then computes a quantization distance between the query item and each of the database items in the narrower search space (i.e., each of the database items in the selected subset (step 280)). The quantization distances are calculated using the quantization codes associated with each of the subset of database items and either the feature vector for the query item or a quantization code for the query item. If the feature vector of the query item is used in this step, then Asymmetric Quantizer Distance (AQD) may be used to measure similarities: $AQD(x, y) = f_x^T(Cb_y)$, where:
x is the query item and y is the database item;
$f_x$ is the feature vector for x;
T is transpose operation;
where $C \in$ is the dictionary book for quantization; and
and $b_y$ is the index indicator that indicates a column in the dictionary book As the AQD calculation involves computing the inner product between feature vector x and the quantization code y, the larger the AQD value, the closer the quantization distance between x and y is, and the more similar x and y are.

If a quantization code is used for the query item in this step, the quantization distance (QD) may be used to measure similarities: $QD(x, y) = (Cb_x)^T(Cb_y)$. The larger the QD value, the smaller the quantization distance between two items, and the more similar the items are.

The system retrieves the database item with the closest quantization distance to the query item, as this is considered the database item with the closest semantic meaning the query item (step 290).

2.5 Pictorial Example of Prediction Phase

Figure 3B:
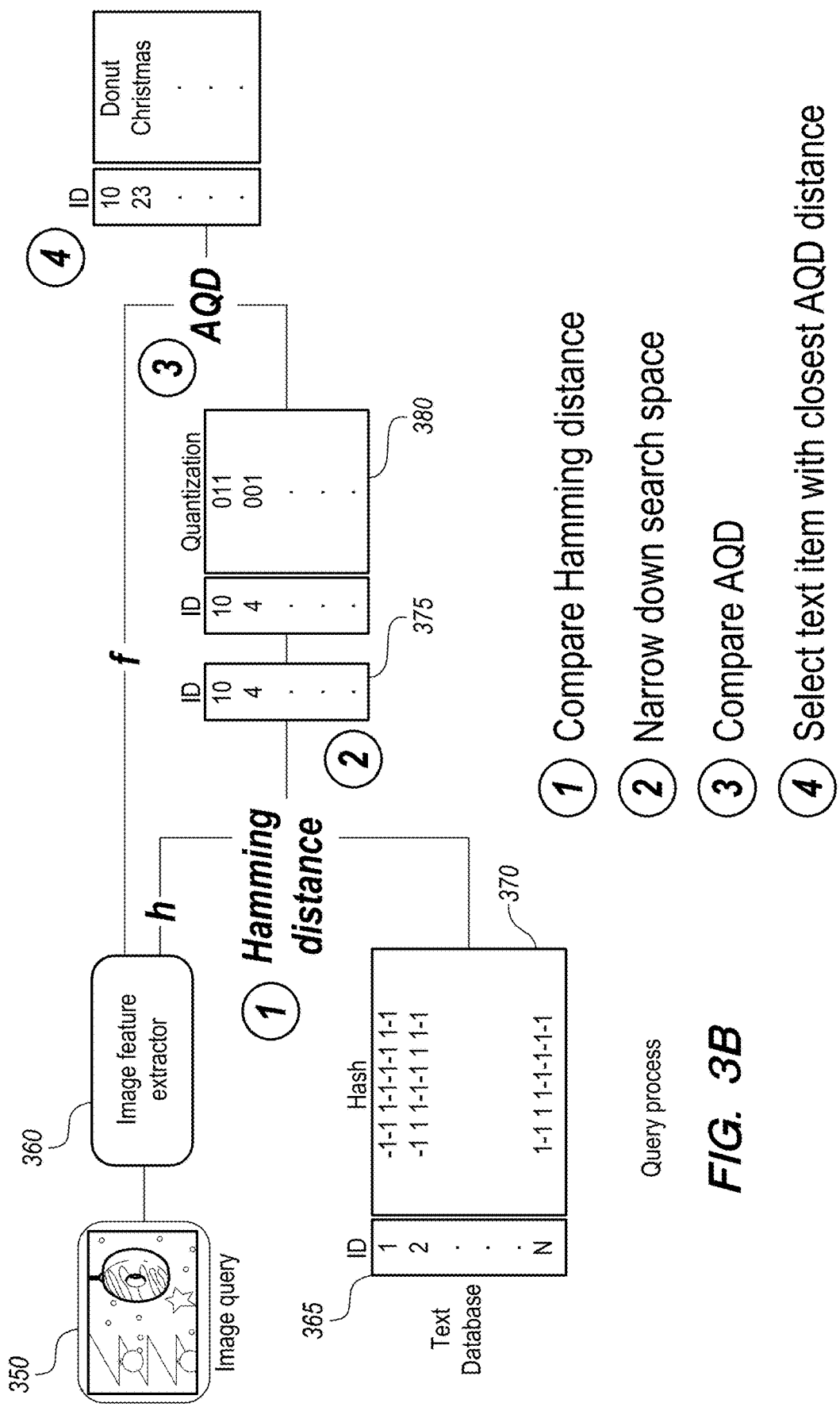
FIG. 3B is a diagram that illustrates a pictorial example of the prediction phase.

FIG. 3B depicts a pictorial example of the prediction process according to one embodiment. In this example, the system finds a matching text description from a database 365 for image query item 350. Neural network 360 generates a feature vector f for the image query item 350. Binary hash code h is then computed based on the feature vector. The process then proceeds as follows:

(1) The system computes the Hamming distance between the image query item and each of the text database items using binary hash codes for the image query items and each of the database items (binary hash codes 370 are associated with text database 365).

(2) The system narrows the search space by selecting a subset of database items 375 with closest Hamming distance to the image query item 360.

(3) The system computes the AQD value between the image query item and each of the subset of text items using feature vector f for the query item and the quantization codes 380 for the text database items in the subset.

(4) The system retrieves the text database item with the closest quantization distance to the image query item based on the AQD values. The larger the AQD value for the query item and a database item, the closer the quantization distance between the items, and closer the items are semantically.

3. Example System

Figure 4:
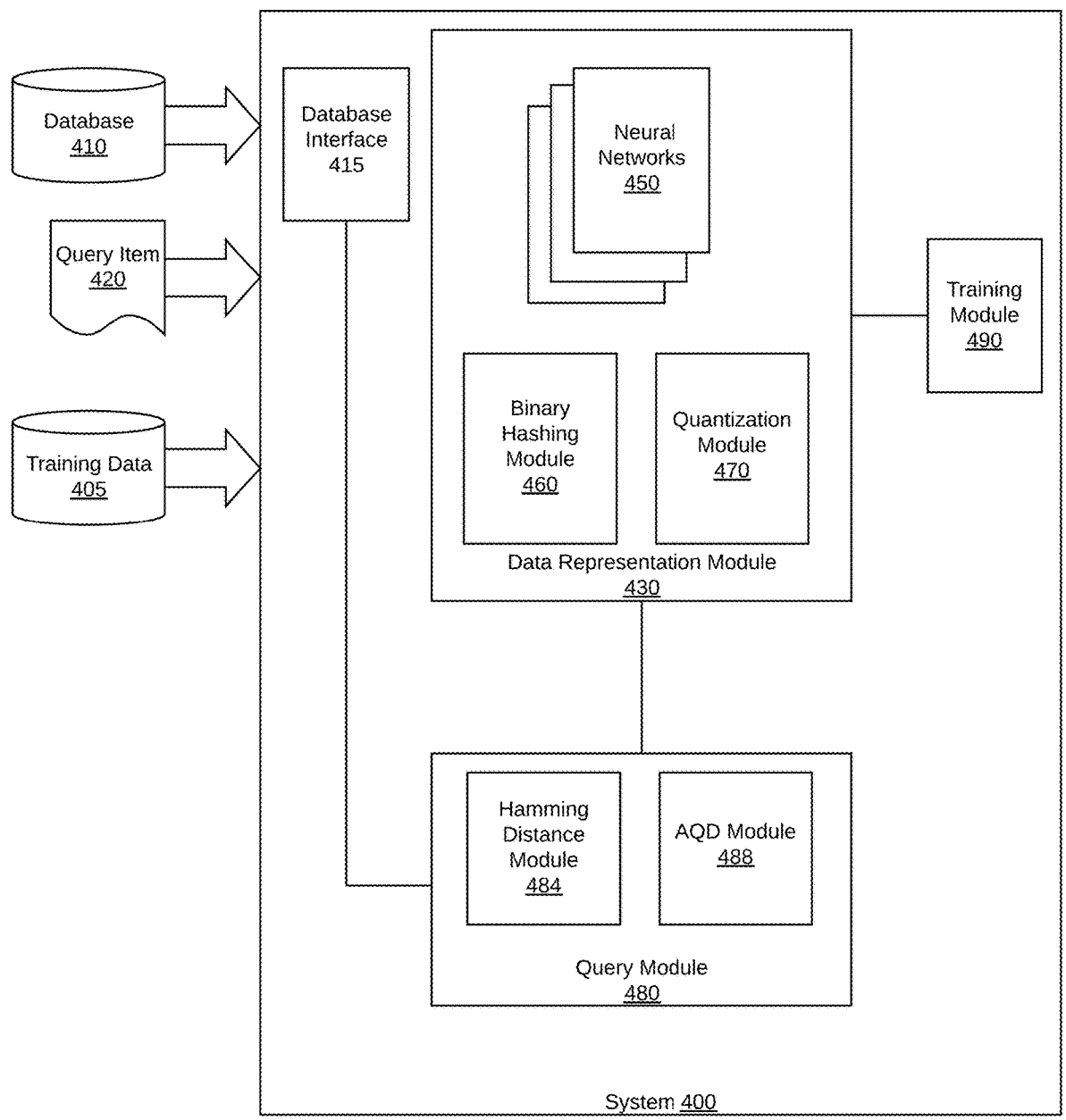
FIG. 4 is a block diagram of an example system for performing cross-modal data retrieval using binary hashing and quantization codes.

FIG. 4 illustrates an example software architecture for a system for performing cross-modal retrieval in accordance with the methods described herein. Other software architectures may be used, and the methods described herein are not limited to the illustrated architecture. The system 400 includes a data representation module 430 that includes neural networks 450, binary hashing module 460, and quantization module 470. As described above, these modules respectively generate feature vectors, binary hash codes, and quantization codes for database items 410 and query item 420. These modules are trained by training module 490 using training data 405 in accordance with the training method discussed above. There is one neural network module 450 for each type of data modality handled by the system.

Query module 480 identifies and retrieves the item in database 410 that is semantically closest to query item 420 in accordance with the prediction process described above. In this example, query module 480 includes Hamming distance module 484 and AQD module 488, which respectfully calculate Hamming distances and asynchronous quantization distances between the query item and database items. Database interface 415 enables the system to interface with database 410.

5. General

The methods described with respect to FIGS. 1-4 are embodied in software and performed by a computer system (comprising one or more computing devices) executing the software. A person skilled in the art would understand that a computer system has one or more physical memory units, disks, or other physical, computer-readable storage media for storing software instructions, as well as one or more processors for executing the software instructions. A person skilled in the art would also understand that a computer system may be stand-alone or connected to a computer network as a server. In certain embodiments, a computer system controlled by one entity may perform the training process and a computer system controlled by another entity may perform the prediction process.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for cross-modal retrieval of a database item having similar semantic meaning to a query item of a different modality, the method comprising:
   performing the following with respect to a training phase:
   (a) obtaining a training data set, wherein the training data set includes pairs of data items, wherein each pair includes a data item of a first modality and a data item of a second modality, wherein the first and second modalities are different, wherein a first subset of pairs have data items of similar semantic meaning and a second subset of pairs have data items of dissimilar semantic meaning, and wherein each pair is labeled based on the similarity or dissimilarity of semantic meaning of the data items in the pair;
   (b) applying a first neural network to the data items of the first modality in the training data set to generate a feature vector for each of the data items of the first modality;
   (c) applying a second neural network to the data items of the second modality in the training data set to generate a feature vector for the each of the data items of the second modality;
   (d) generating a binary hash code and a quantization code for each of the data items in the training data set based on the feature vectors for the data items, wherein the binary hash codes are generated using a binary hash algorithm and the quantization codes are generated using a quantization algorithm;
   (e) calculating a loss value using a loss function that measures an extent to which the feature vectors, the binary hash codes, and the quantization codes preserve semantic similarity correlations in the training data pairs and that enables the system to simultaneously optimize the feature vectors, the binary hash codes, and the quantization codes, wherein the loss function comprises four parts: (1) a cross-entropy loss that measures similarities between different modalities based on dense feature vectors, (2) a quantization loss that measures differences between dense feature vectors and quantized features, (3) a binary hashing loss that measures differences between dense feature vectors and binarized features, and (4) a balance loss to optimize bit information in binary code;
   (f) updating parameters of the first and second neural networks, the binary hash algorithm, and the quantization algorithm to reduce the loss value; and
   (g) repeating steps (b)-(f) for a number of iterations until the loss value converges to a threshold;
   performing the following with respect to a prediction phase:
   (h) accessing a database with a plurality of database items of the first modality;
   (i) applying the first neural network to the database items to generate a feature vector for each of the database items;
   (j) generating a binary hash code and a quantization code for each of the database items using the feature vectors for the database items, the binary hash algorithm, and the quantization algorithm;
   (k) receiving a query item of the second modality;
   (l) applying the second neural network to the query item to generate a feature vector for the query item;
   (m) generating a binary hash code for the query item based on the feature vector for the query item;
   (n) calculating a distance between the query item and each of the database items based on the binary hash codes of the query item and the database items;
   (o) selecting a subset of closest database items to the query item based on the calculated distances;
   (p) computing a quantization distance between the query item and each of the database items in the subset using the quantization codes for each of the database items in the subset; and
   (q) retrieving the database item in the subset with the closest quantization distance to the query item.

2. The method of claim 1, wherein the first modality is text, and the second modality is images.

3. The method claim 1, wherein the first modality is images, and the second modality is text.

4. The method of claim 1, wherein a convolutional neural network is applied to image data items and a long-short term memory neural network or multilayer perceptron is applied to text data items.

5. The method of claim 1, wherein the distances calculated based on the binary hash codes are Hamming distances.

6. The method of claim 1 wherein the quantization distance is an asymmetric quantizer distance (AQD) calculated using the feature vector of the query item and the quantization code of the database item.

7. The method of claim 1, wherein a quantization code is also generated for the query item, and the quantization distance is calculated using the quantization code of the query item and the quantization code of the database item.

8. A computer system for cross-modal retrieval of a database item having similar semantic meaning to a query item of a different modality, the system comprising:
   one or more processors;
   one or more memory units coupled to the one or more processors, wherein the one or more memory units store instructions that, when executed by the one or more processors, cause the system to perform the operations of:
   performing the following with respect to a training phase:
   (a) obtaining a training data set, wherein the training data set includes pairs of data items, wherein each pair includes a data item of a first modality and a data item of a second modality, wherein the first and second modalities are different, wherein a first subset of pairs have data items of similar semantic meaning and a second subset of pairs have data items of dissimilar semantic meaning, and wherein each pair is labeled based on the similarity or dissimilarity of semantic meaning of the data items in the pair;

(b) applying a first neural network to the data items of the first modality in the training data set to generate a feature vector for each of the data items of the first modality;

(c) applying a second neural network to the data items of the second modality in the training data set to generate a feature vector for the each of the data items of the second modality;

(d) generating a binary hash code and a quantization code for each of the data items in the training data set based on the feature vectors for the data items, wherein the binary hash codes are generated using a binary hash algorithm and the quantization codes are generated using a quantization algorithm;

(e) calculating a loss value using a loss function that measures an extent to which the feature vectors, the binary hash codes, and the quantization codes preserve semantic similarity correlations in the training data pairs and that enables the system to simultaneously optimize the feature vectors, the binary hash codes, and the quantization codes, wherein the loss function comprises four parts: (1) a cross-entropy loss that measures similarities between different modalities based on dense feature vectors, (2) a quantization loss that measures differences between dense feature vectors and quantized features, (3) a binary hashing loss that measures differences between dense feature vectors and binarized features, and (4) a balance loss to optimize bit information in binary code;

(f) updating parameters of the first and second neural networks, the binary hash algorithm, and the quantization algorithm to reduce the loss value; and (g) repeating steps (b)-(f) for a number of iterations until the loss value converges to a threshold;

performing the following with respect to a prediction phase:

(h) accessing a database with a plurality of database items of the first modality;

(i) applying the first neural network to the database items to generate a feature vector for each of the database items;

(j) generating a binary hash code and a quantization code for each of the database items using the feature vectors for the database items, the binary hash algorithm, and the quantization algorithm;

(k) receiving a query item of the second modality;

(l) applying the second neural network to the query item to generate a feature vector for the query item;

(m) generating a binary hash code for the query item based on the feature vector for the query item;

(n) calculating a distance between the query item and each of the database items based on the binary hash codes of the query item and the database items;

(o) selecting a subset of closest database items to the query item based on the calculated distances;

(p) computing a quantization distance between the query item and each of the database items in the subset using the quantization codes for each of the database items in the subset; and (q) retrieving the database item in the subset with the closest quantization distance to the query item.

9. The system of claim 8, wherein the first modality is text, and the second modality is images.

10. The system of claim 8, wherein the first modality is images, and the second modality is text.

11. The system of claim 8, wherein a convolutional neural network is applied to image data items and a long-short term memory neural network or multilayer perceptron is applied to text data items.

12. The system of claim 8, wherein the distances calculated based on the binary hash codes are Hamming distances.

13. The system of claim 8, wherein the quantization distance is an asymmetric quantizer distance (AQD) calculated using the feature vector of the query item and the quantization code of the database item.

14. The system of claim 8, wherein a quantization code is also generated for the query item, and the quantization distance is calculated using the quantization code of the query item and the quantization code of the database item.

* * * * *